US011478950B2

(12) United States Patent
McGehee (10) Patent No.: US 11,478,950 B2
(45) Date of Patent: Oct. 25, 2022

(54) FIBERGLASS CUTTING DEVICE WITH YOKE-SUPPORTED ADJUSTABLE ROLLER

(71) Applicant: Phoenix Composites Equipment, Inc., Largo, FL (US)

(72) Inventor: Scott McGehee, Largo, FL (US)

(*) Notice: Subject to any disclaimer, the term of this patent is extended or adjusted under 35 U.S.C. 154(b) by 0 days.

(21) Appl. No.: 17/174,563

(22) Filed: Feb. 12, 2021

(65) Prior Publication Data

US 2022/0258372 A1 Aug. 18, 2022

(51) Int. Cl.
*B26D 7/26* (2006.01)
*B26D 7/20* (2006.01)

(52) U.S. Cl.
CPC .......... *B26D 7/265* (2013.01); *B26D 7/204* (2013.01)

(58) Field of Classification Search
CPC ..... B26D 7/265; B26D 7/204; Y10T 83/4841; Y10T 83/4844; Y10T 83/4833; Y10T 83/4836; Y10T 83/9399; Y10T 83/9464; C03B 37/16; D01G 1/04; Y10S 83/913
See application file for complete search history.

(56) References Cited

U.S. PATENT DOCUMENTS

| | | | |
|---|---|---|---|
| 1,693,589 A | 12/1928 | Bolton | |
| 2,719,336 A | 10/1955 | Stotler | |
| 3,130,912 A * | 4/1964 | Shelton, V | B29C 41/365 239/428 |
| 3,130,913 A * | 4/1964 | Sbelton, V | C03B 37/16 118/308 |
| 3,155,320 A * | 11/1964 | Jones | B05B 7/1495 239/289 |
| 3,491,443 A * | 1/1970 | Morris | C03B 37/16 30/128 |
| 3,763,561 A * | 10/1973 | Scharfenberger | D01G 1/04 83/913 |
| 3,947,962 A * | 4/1976 | Smith | C03B 37/16 239/336 |
| 3,992,967 A | 11/1976 | Fram | |
| 4,001,935 A * | 1/1977 | Krohn | C03B 37/16 30/180 |
| 4,081,904 A | 4/1978 | Krohn et al. | |

(Continued)

FOREIGN PATENT DOCUMENTS

WO WO-2012036727 A2 * 3/2012 ............ B05B 7/145

*Primary Examiner* — Jonathan G Riley
(74) *Attorney, Agent, or Firm* — Larson & Larson; Justin P. Miller; Frank Liebenow (57) ABSTRACT

The disclosed fiberglass cutting device with yoke-supported adjustable roller is a device, or "gun," with on-the-fly— during operation adjustment of the spacing between the anvil roller and cutter. This adjustability is accomplished using only a single tension-adjusting knob located to one side of the anvil roller. This is superior to the prior art that required, at a minimum, two tension-adjusting knobs—one for each side of the anvil roller. To solve this problem, the fiberglass cutting device with yoke-supported adjustable roller supports the supports the anvil roller on both ends using a yoke. The position of the yoke is controlled by a single tension-adjustment knob that moves both arms of the yoke, thus maintaining the anvil roller in a position parallel to the cutting roller. The use of the yoke also avoids only supporting the anvil roller at a single end, which creates an unstable cantilevered-roller.

15 Claims, 9 Drawing Sheets

(56) References Cited

U.S. PATENT DOCUMENTS

| | | | |
|---|---|---|---|
| 4,640,165 A * | 2/1987 | McMahon | B26D 7/2614 |
| | | | 83/346 |
| 4,770,117 A * | 9/1988 | Hetherington | B05B 7/1495 |
| | | | 239/420 |
| 10,213,787 B2 | 2/2019 | Domer et al. | |
| 2003/0047049 A1 | 3/2003 | Barker et al. | |
| 2012/0222317 A1* | 9/2012 | Rohrer | D01G 1/04 |
| | | | 30/300 |
| 2016/0001457 A1* | 1/2016 | Shapiro | B26D 7/14 |
| | | | 83/487 |

\* cited by examiner

FIBERGLASS CUTTING DEVICE WITH YOKE-SUPPORTED ADJUSTABLE ROLLER

FIELD

This invention relates to the field of fiber cutters and more particularly to a fiber cutting device with on-the-fly compression adjustment.

BACKGROUND

Fiberglass fibers are an input to many industrial processes. For example, for fiberglass spray lay-up, a mixture of resin and chopped fiberglass fibers is sprayed against a mold.

The spraying is performed continuously, with the fibers and resin being mixed as they are needed. To support the spraying, long fibers are drawn into a device, where they are chopped into shorter lengths before being discharged.

The cutting operation includes sandwiching the fiberglass fibers between a cutting roller and a sacrificial anvil roller. The blades of the cutting roller cut the fibers, but also consume the-softer anvil roller.

Thus, the anvil roller is continuously decreasing in diameter. The result is a loss of compression as its surface moves further away from the surface of the cutting roller.

Disassembling the device to adjust tension is time-consuming and interrupts the work flow.

What is needed is a way of adjusting the compression and spacing between the anvil roller and cutting roller without disassembling the device.

SUMMARY

The disclosed fiberglass cutting device with yoke-supported adjustable roller is a device, or "gun," with on-the-fly—during operation adjustment of the spacing between the anvil roller and cutter.

This adjustability is accomplished using only a single tension-adjusting knob located to one side of the anvil roller. This is superior to the prior art that required, at a minimum, two tension-adjusting knobs—one for each side of the anvil roller.

Separating the tension adjustment into two knobs is a poor solution. Not only is it more difficult for the operator to adjust the tension because two knobs must be adjusted, but it is likely that the resulting position of the anvil roller is not parallel to the cutting roller, but rather set at an angle. The result is uneven compression, and thus poor cutting performance.

To solve this problem, the fiberglass cutting device with yoke-supported adjustable roller supports the supports the anvil roller on both ends using a yoke. The position of the yoke is controlled by a single tension-adjustment knob that equally moves both arms of the yoke, thus maintaining the anvil roller in a position parallel to the cutting roller. The use of the yoke also avoids supporting the anvil roller at only a single end, which creates an unstable cantilevered-roller.

In addition to being unstable, a cantilevered arrangement of the anvil roller creates uneven compression across the width of the anvil roller, with greater compression near the body of the gun, and lesser compression further away from the anvil roller.

In contrast, the fiberglass cutting device with yoke-supported adjustable roller uses the axle of the anvil roller to extend through the arms of the yoke, and into a slot in the body of the gun. The axle is held in position by a threaded rod, its position controlled by an external knob.

Rotation of the external knob moves the threaded rod toward or away from the axle, which in turn pushes or releases the anvil roller with respect to the cutting roller, adjusting compression.

The operator can perform this action during use of the device without stopping work.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Figure 1:
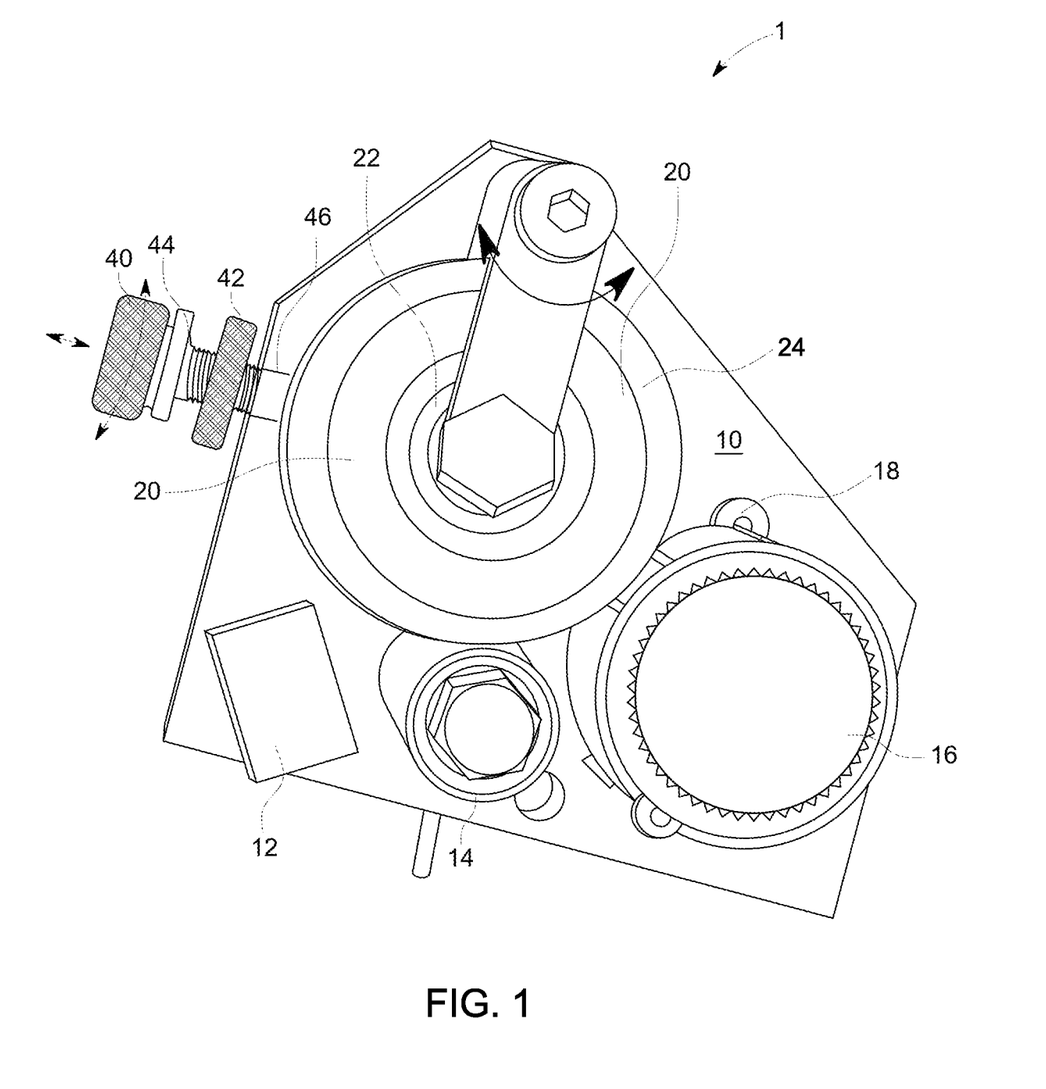
FIG. 1 illustrates a first view of the fiberglass cutter with yoke-supported roller.
Figure 2:
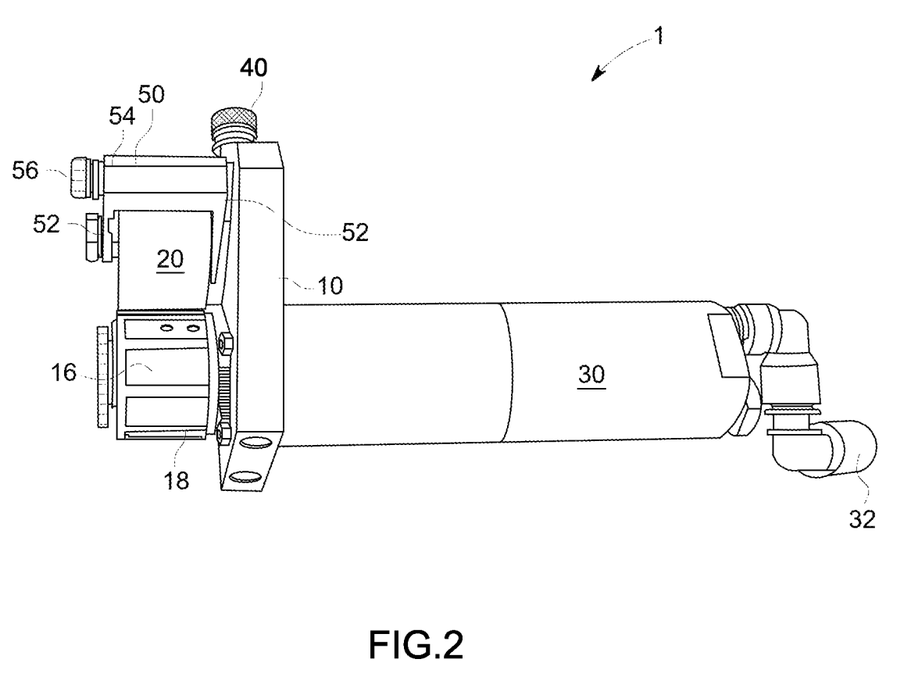
FIG. 2 illustrates a second view, showing an air motor, of the fiberglass cutter with yoke-supported roller.
Figure 3:
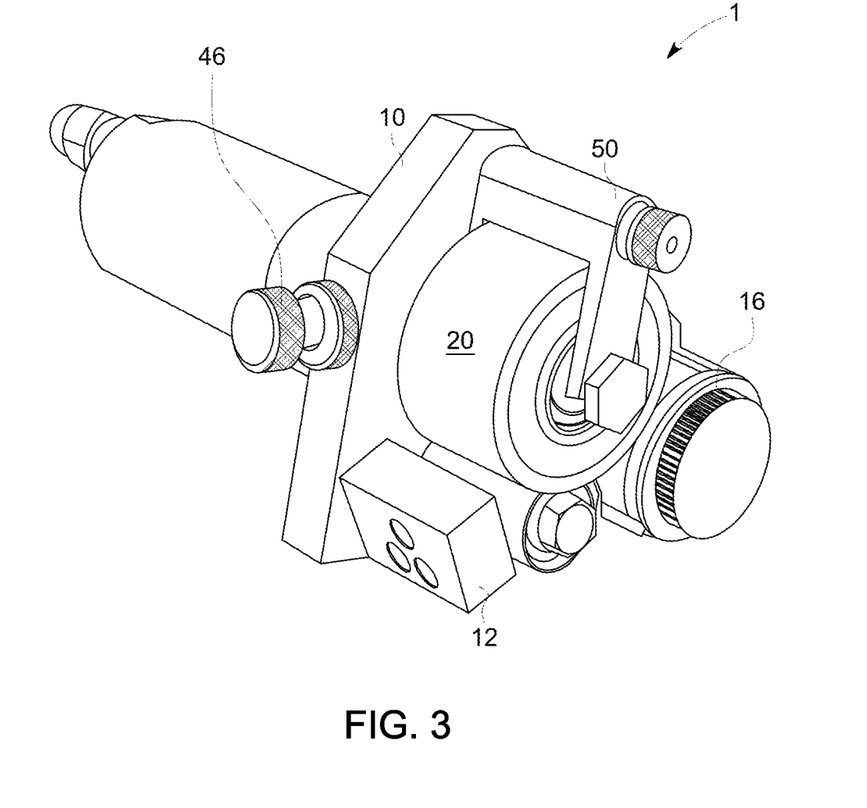
FIG. 3 illustrates a first front isometric view of the fiberglass cutter with yoke-supported roller.

Referring to FIGS. 1-3, a first view, second view, and first isometric view of the fiberglass cutter with yoke-supported roller are shown.

The fiberglass cutter with yoke-supported roller 1 is shown with body 10, to which the components are attached. The components include a fiberglass fiber guide 12 that guides the fiberglass, which is then drawn between the feed roller 14 and anvil roller 20, then between the cutting roller 16 and the anvil roller 20, where the fiberglass is cut by the blades 18.

Figure 8:
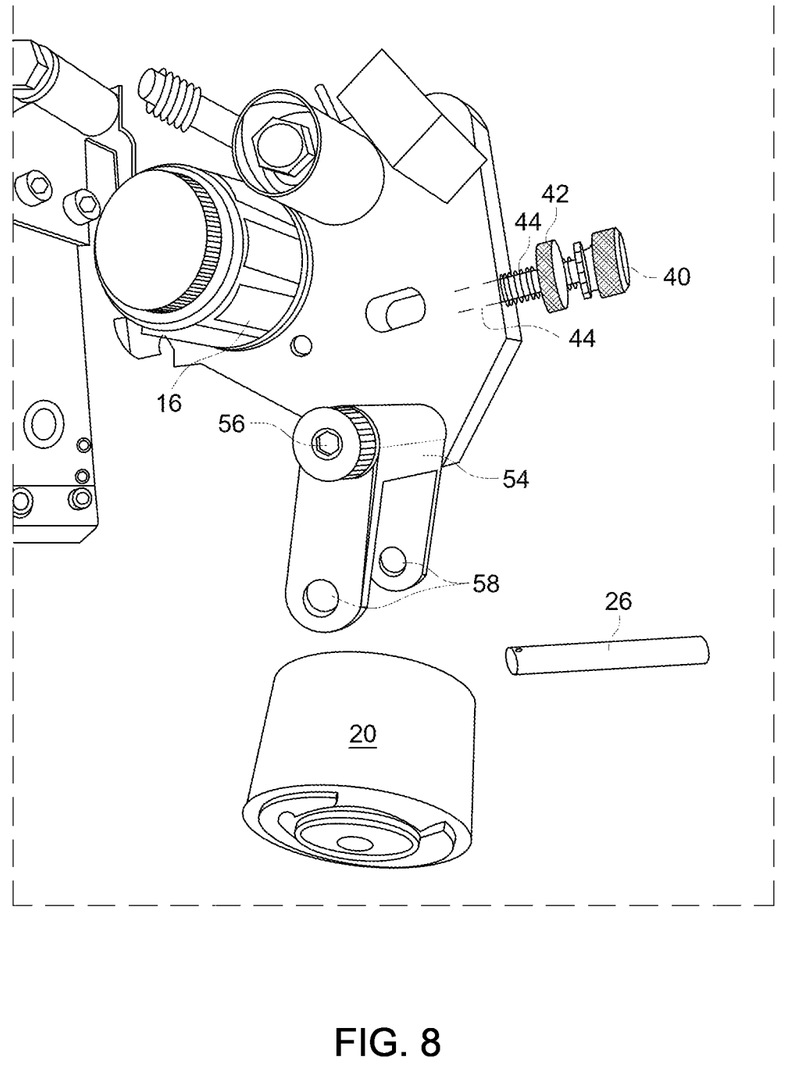
FIG. 8 illustrates a front view, with the anvil roller removed and the yoke rotated out of position, of the fiberglass cutter with yoke-supported roller.

The anvil roller 20 is formed from a stiff core 22 and softer outer layer 24, rotating about the anvil roller axle 26 (see FIG. 8).

Rotation of the compression knob 40 causes the compression shaft 44 to move in and out of the threaded hole 46 in the body 10, changing the position of the anvil roller axle 26 (see FIG. 8), and thus the position of the yoke 50.

The compression locknut 42 allows a user to fix the compression shaft 44, thus maintaining a specific compression between the anvil roller 20 and cutting roller 16.

Also shown is the yoke 50, supporting the anvil roller 20. The yoke 50 includes yoke arms 52, yoke body 54. The yoke 50 rotates about the yoke bolt 56.

An air motor 30, supplied via an air supply connection 32, provides the rotational energy to turn the cutting roller 16.

Figure 4:
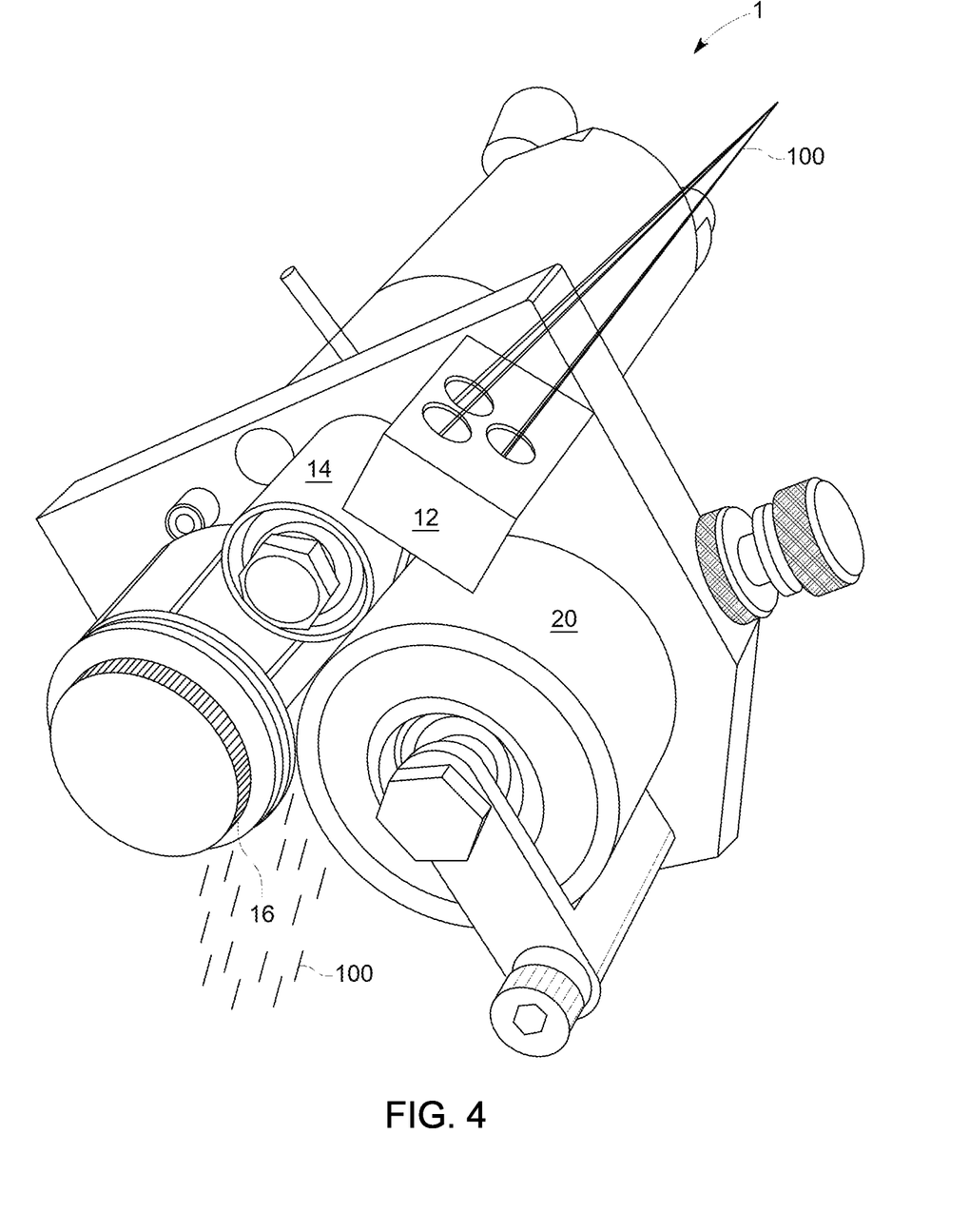
FIG. 4 illustrates a second front isometric view of the fiberglass cutter with yoke-supported roller.

Referring to FIG. 4, a second front isometric view of the fiberglass cutter with yoke-supported roller is shown.

Fiberglass fibers 100 are shown passing through the fiberglass fiber guide 12, between the feed roller 14 and the anvil roller 20, before being cutting between the cutting roller 16 and the anvil roller 20, then discharged.

Figure 5:
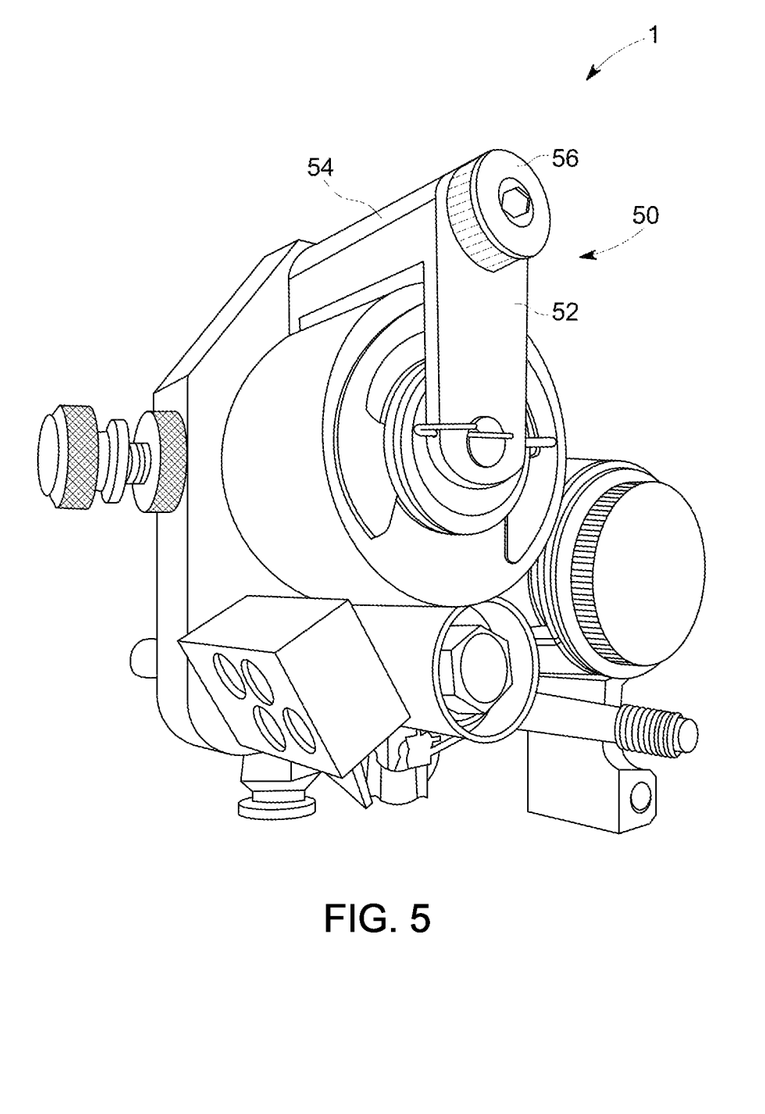
FIG. 5 illustrates a third front isometric view of the fiberglass cutter with yoke-supported roller.

Referring to FIG. 5, a third front isometric view of the fiberglass cutter with yoke-supported roller is shown.

Again shown is the yoke 50 with yoke arms 52, yoke body 54, rotating about the yoke bolt 56.

Figure 6:
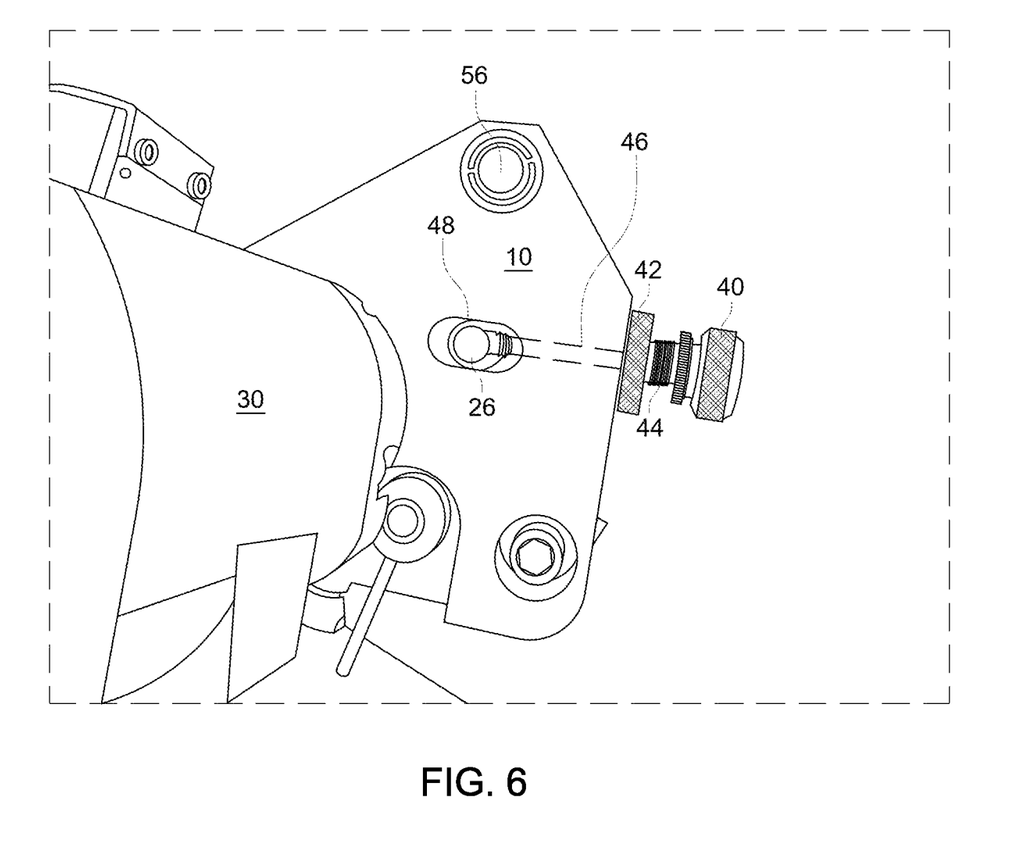
FIG. 6 illustrates a back view of the fiberglass cutter with yoke-supported roller.

Referring to FIG. 6, a back view of the fiberglass cutter with yoke-supported roller is shown.

The compression knob 40 adjusts position of the compression shaft 44, which is visible interacting with the anvil roller axle 26 within the interface slot 48 of the body 10.

The compression locknut 42 optionally fixes the position of the compression shaft 44.

Figure 7:
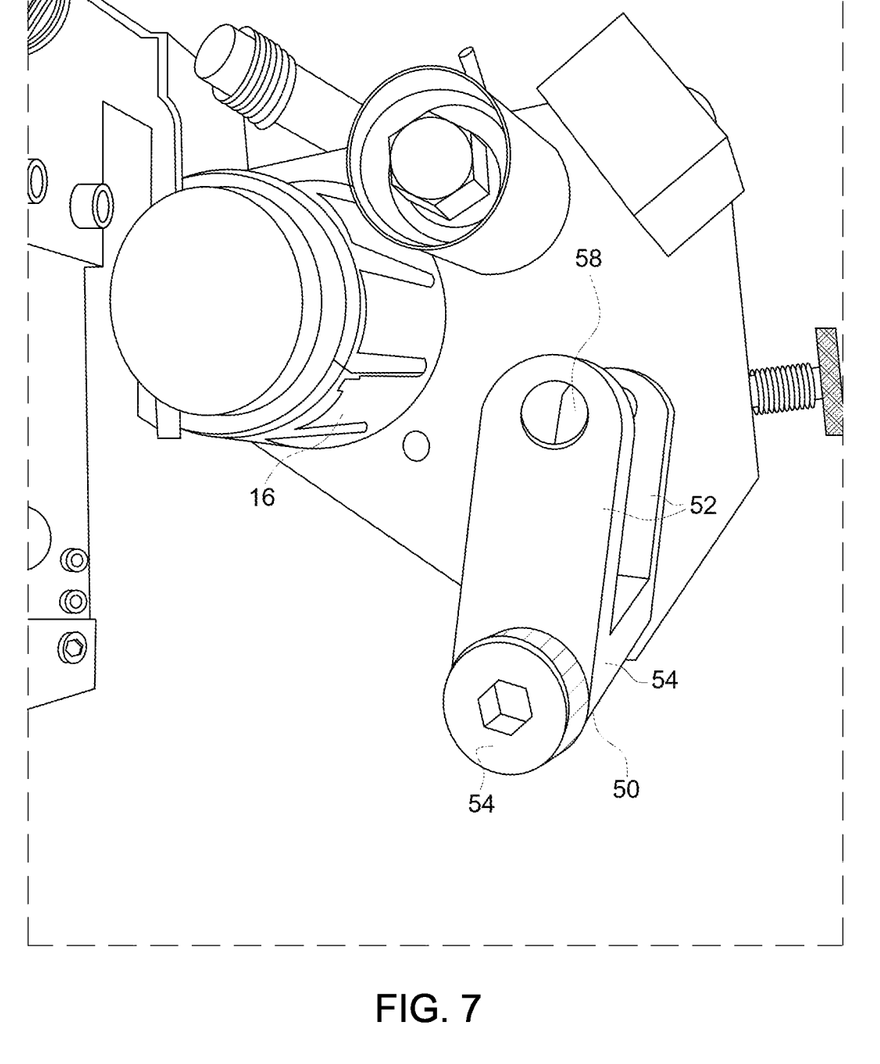
FIG. 7 illustrates a front view, with the anvil roller removed, of the fiberglass cutter with yoke-supported roller.

Referring to FIGS. 7 and 8, two front views, with the anvil roller removed, of the fiberglass cutter with yoke-supported roller are shown.

The parts of the yoke 50 are now fully visible, including the yoke arms 52, yoke body 54, yoke bolt 56, and yoke axle interface 58. The yoke axle interface 58 supports the anvil roller axle 26. Thus, the position of the compression shaft 44 affects the position of the anvil roller axle 26, which in turn causes rotation of the yoke 50. But the yoke 50 ensures that the anvil roller axle 26 remains parallel to the cutting roller 16, thus ensuring even cutting of the fiberglass 100 (see FIG. 4).

Figure 9:
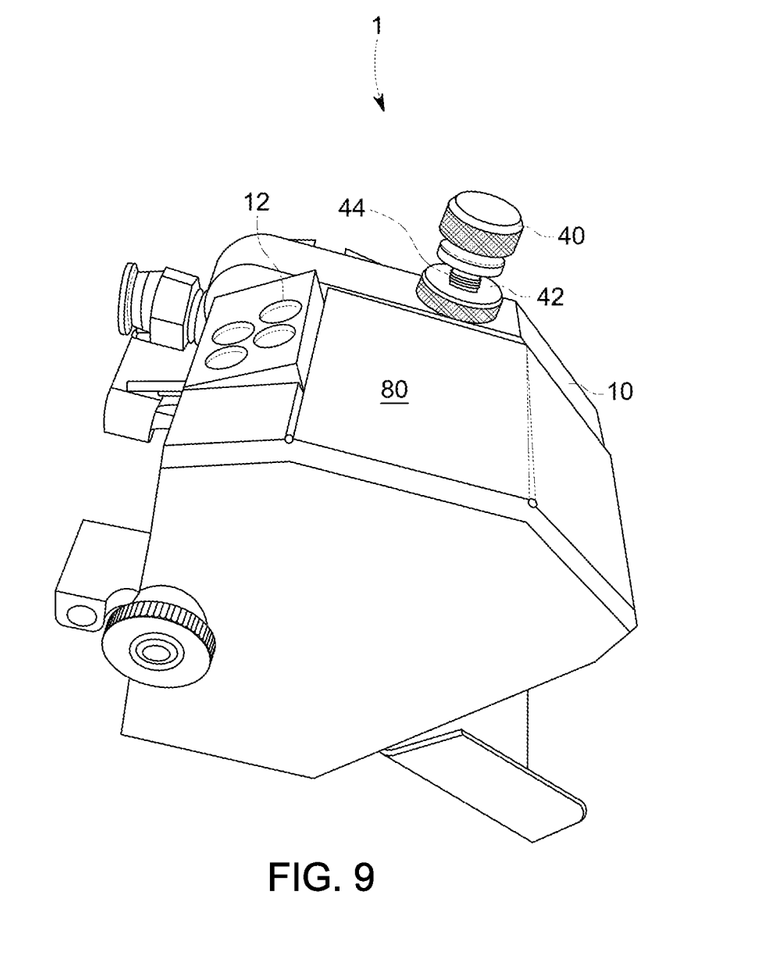
FIG. 9 illustrates a fully-assembled view of the fiberglass cutter with yoke-supported roller.

Referring to FIG. 9, a fully-assembled view of the fiberglass cutter with yoke-supported roller is shown.

The housing 80 is shown installed, shielding the internal parts of the fiberglass cutter with yoke-supported roller 1.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A fiberglass cutting device comprising:
   a body;
   a cutting roller;
   an anvil roller;
      the anvil roller rolling against the cutting roller;
      the anvil roller rotating about an anvil roller axle;
   a yoke supporting the anvil roller;
   a single compression knob controlling a position of the anvil roller axle;
      the single compression knob located off-center;
      motion of the single compression knob changing a position of the anvil roller axle with respect to the cutting roller, the yoke maintains the anvil roller as parallel to the cutting roller;
   whereby without disassembling the device, the single compression knob alters the position of the anvil roller axle, and thus adjusts compression between the cutting roller and the anvil roller.

2. The fiberglass cutting device of claim 1, wherein the yoke comprises:
   two yoke arms connected to a yoke body;
   the yoke body rotating about a yoke bolt;
   the two yoke arms supporting the anvil roller axle;
   whereby the yoke maintains the anvil roller axle in a position parallel to the yoke bolt, thus ensuring the anvil roller remains parallel to the cutting roller.

3. The fiberglass cutting device of claim 1, further comprising:
   a compression shaft;
      the single compression knob controlling motion of the compression shaft, with rotation of the single compression knob causing linear motion of the compression shaft;
   an interface slot within the body;
      the anvil roller axle and the compression shaft in contact within the interface slot;
   whereby the compression shaft creates compression by pushing against the anvil roller axle, causing motion of the anvil roller with respect to the cutting roller.

4. The fiberglass cutting device of claim 2, further comprising:
   a compression shaft;
      the single compression knob controlling motion of the compression shaft, with rotation of the single compression knob causing linear motion of the compression shaft;
   an interface slot within the body;
      the anvil roller axle and the compression shaft in contact within the interface slot;
   whereby the compression shaft creates compression by pushing against the anvil roller axle, causing motion of the anvil roller with respect to the cutting roller.

5. The fiberglass cutting device of claim 4, further comprising:
   a compression locknut;
      the compression locknut rotating around the compression shaft, and able to compress against the body;
   whereby compression of the compression locknut against the body fixes the position of the compression shaft.

6. A fiberglass cutting and dispensing device, the device comprising:
   a body;
   a fiberglass cutting roller;
   an anvil compression roller;
      the fiberglass cutting roller parallel to the anvil compression roller;
      the anvil compression roller worn away by the fiberglass cutting roller during operation of the device;
   an axle passing through the anvil compression roller;
   a compression shaft;
      the compression shaft contacting an end of the axle;
   an external tension-adjusting knob;
      rotation of the external tension-adjusting knob causing the compression shaft to change position, in turn changing position of the axle;
   a yoke with a position controlled by the external tension-adjusting knob;
      the axle protruding beyond one side of the yoke to interface with the external tension-adjusting knob;
      the position of the yoke controlling the position of the anvil compression roller;
      adjustment of the external tension-adjusting knob causing movement of the yoke, and thus movement of the anvil compression roller with respect to the fiberglass cutting roller, while maintaining the fiberglass cutting roller as parallel to the anvil compression roller.

7. The fiberglass cutting and dispensing device of claim 6, wherein the yoke comprises:
   two yoke arms connected to a yoke body;
      the yoke body rotating about a yoke bolt;
      the two yoke arms supporting the axle;
   whereby the yoke maintains the axle in a position parallel to the yoke bolt, thus ensuring the anvil compression roller remains parallel to the fiberglass cutting roller.

8. The fiberglass cutting and dispensing device of claim 6, further comprising:
   a compression shaft;
      the external tension-adjusting knob controlling motion of the compression shaft, with rotation of the external tension-adjusting knob causing linear motion of the compression shaft;
   an interface slot within the body;
      the axle and the compression shaft in contact within the interface slot;
   whereby the compression shaft creates compression by pushing against the axle, causing motion of the anvil compression roller with respect to the fiberglass cutting roller.

9. The fiberglass cutting and dispensing device of claim 7, further comprising:
   a compression shaft;
      the external tension-adjusting knob controlling motion of the compression shaft, with rotation of the external tension-adjusting knob causing linear motion of the compression shaft;
   an interface slot within the body;
      the axle and the compression shaft in contact within the interface slot;
   whereby the compression shaft creates compression by pushing against the anvil roller axle, causing motion of the anvil compression roller with respect to the fiberglass cutting roller.

10. The fiberglass cutting and dispensing device of claim 8, further comprising:
    a compression locknut;
       the compression locknut rotating around the compression shaft, and able to compress against the body;
    whereby compression of the compression locknut against the body fixes the position of the compression shaft.

11. A device for cutting fiberglass fibers to shorter lengths, the device comprising:
    a body;
    a cutting roller of constant diameter;
    the cutting roller rotating with respect to the body;
    an anvil roller with an axle;
    the anvil roller parallel to the cutting roller;
    the anvil roller rolling against the cutting roller;
    a yoke;
    the yoke supporting the axle at a distal point and a proximal point;
    the yoke rotating with respect to the body;
    a tension-adjusting knob part that is part of a tension-adjusting mechanism;
    the tension-adjusting knob rotating a compression shaft, the compression shaft rotating inside the body;
    one end of the axle extending into the body and contacting the compression shaft;
    the tension-adjusting knob moving the axle with respect to the body, while maintaining the cutting roller in a parallel relationship to the anvil roller;
    the tension-adjusting mechanism in contact with only a single end of the axle;
    whereby rotation of the tension-adjusting knob allows adjustment of compression between the anvil roller and cutting roller, while maintaining the anvil roller and cutting roller as parallel.

12. The device of claim 11, the yoke further comprising:
    two yoke arms connected to a yoke body;
       the yoke body rotating about a yoke bolt;
       the two yoke arms supporting the axle;
    whereby the yoke maintains the axle in a position parallel to the yoke bolt, thus ensuring the anvil roller remains parallel to the cutting roller.

13. The device of claim 11, further comprising:
    a compression shaft;
       the tension-adjusting knob controlling motion of the compression shaft, with rotation of the tension-adjusting knob causing linear motion of the compression shaft;
    an interface slot within the body;
       the anvil roller axle and the compression shaft in contact within the interface slot;
    whereby the compression shaft creates compression by pushing against the axle, causing motion of the anvil roller with respect to the cutting roller.

14. The device of claim 12, further comprising:
    a compression shaft;
       the tension-adjusting knob controlling motion of the compression shaft, with rotation of the tension-adjusting knob causing linear motion of the compression shaft;
    an interface slot within the body;
       the axle and the compression shaft in contact within the interface slot;
    whereby the compression shaft creates compression by pushing against the axle, causing motion of the anvil roller with respect to the cutting roller.

15. The device of claim 13, further comprising:
    a compression locknut;
       the compression locknut rotating around the compression shaft, and able to compress against the body;
    whereby compression of the compression locknut against the body fixes the position of the compression shaft.

* * * * *